UNITED STATES PATENT OFFICE.

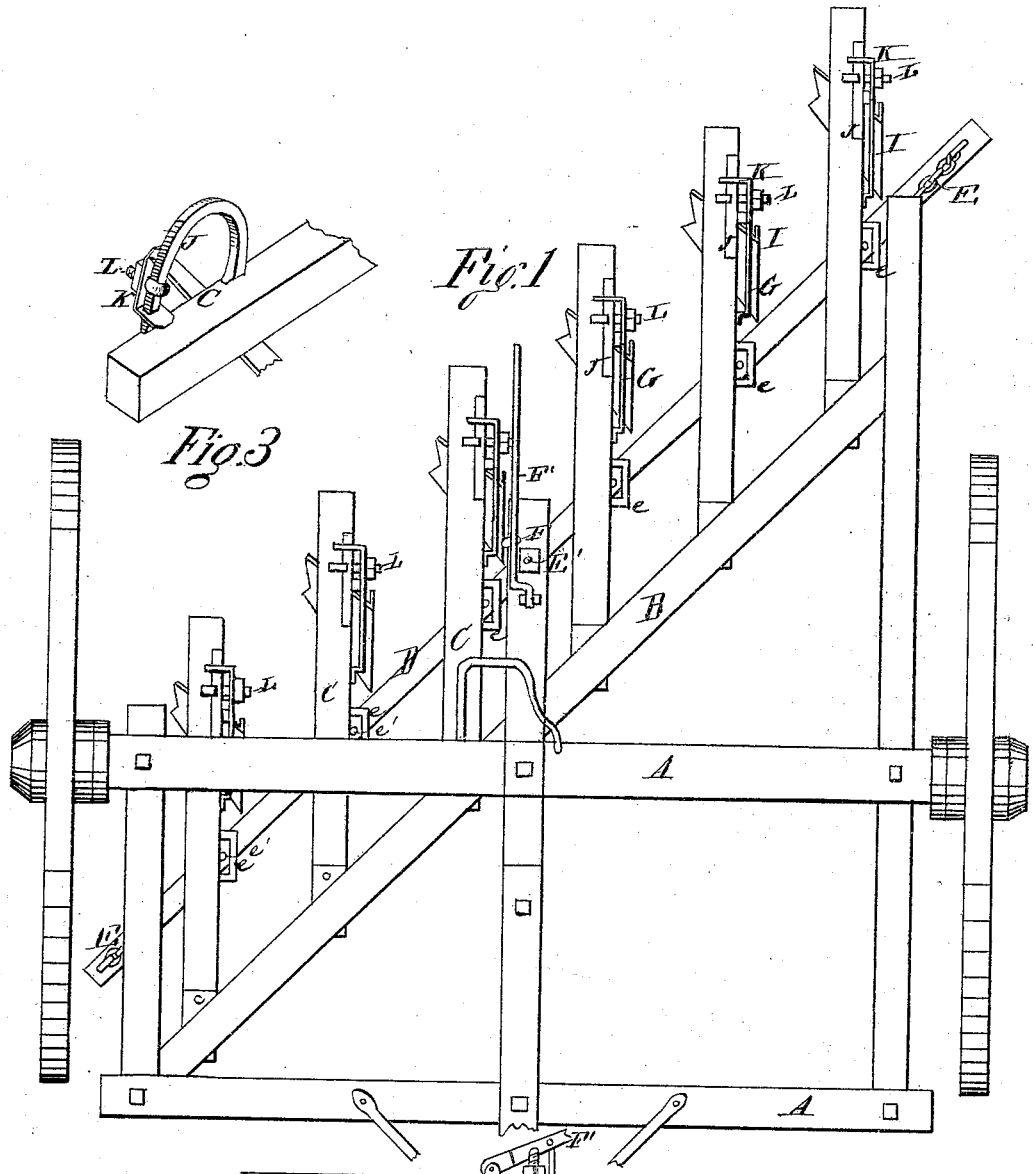

JOHN W. DOUD, OF WARD'S CORNER, IOWA.

IMPROVEMENT IN CULTIVATORS.

Specification forming part of Letters Patent No. 140,484, dated July 1, 1873; application filed September 21, 1872.

*To all whom it may concern:*

Be it known that I, JOHN W. DOUD, of Ward's Corner, in the county of Delaware and State of Iowa, have invented a new and valuable Improvement in Cultivators; and I do hereby declare that the following is a full, clear, and exact description of the construction and operation of the same, reference being had to the annexed drawings making a part of this specification, and to the letters and figures of reference marked thereon.

Figure 1 of the drawings is a representation of a top view of my invention. Fig. 2 is a detail view of the same. Fig. 3 is a detail view, showing the bent plate hereinafter described.

My invention has relation to cultivators, and consists in the construction and novel arrangement of the arch bars, sliding bent plates, and clamp-bolts, whereby an adjustment of the shovel-beams is effected in such a manner that they will be loosened on striking obstructions in the soil, as hereinafter more fully described.

Referring to the drawings, A represents the frame of a wheel-cultivator, to the oblique bar B of which are hinged the drag-bars C, supported upon the lifting-bar D, which is suspended from the frame A by chains E and by the adjustable screw-rod E', and is coupled by means of a rod, F, to a lever, F', pivoted to the frame A, and used for raising and lowering the lifting-bar, and, with it, the drag-bars and the shovels attached thereto. Each drag-bar has a staple, e, through which a rod, e', rising from the lifting-bar, passes, and serves to keep the drag and lifting bars in their proper relative positions. G designates bent straps secured to the drag-bars. Behind said straps lie the standards H pivoted thereto and to the bars, and provided with the shovels I. J designates arched bars secured to and rising above the drag-bars. The shovel-standards are pivoted at about the centers of these arches, and, when moved, their ends pass over the faces of the arches. K designates L-shaped plates supported by the arched bars, the short arms of the former having holes through which the arched bars pass, thus allowing said plates to be moved around said bars. L represents bolts passing through the plates K, and having each a hook on one end which catches the adjacent arched bar. Between the ends of the plates and the sides of the arches the ends of the shovel-beams lie, and with the plates are secured in any desired position by tightening the nuts on the ends of the bolts. The standards are held by the mere pressure of the plates, which is sufficient to enable the shovels to obtain purchase in the soil. But when the shovels meet any obstacle too great to be moved by them, the ends of the beams are pulled out from behind the plates and the shovels permitted to turn back and pass over the obstacle. By adjusting the plates upon the arches the angle of the shovels may be regulated. The lever F' is used for raising the shovels in going to and from the field, while the screw-rod E' is used for adjusting them to the required depth of plowing.

What I claim as my invention, and desire to secure by Letters Patent, is—

In a cultivator, the bent adjustable plate K and bolt L, as described, in combination with the pivoted shovel-standard H and arched bars J, secured to and rising above the drag-bars c, as specified.

In testimony that I claim the above, I have hereunto subscribed my name in the presence of two witnesses.

JOHN W. DOUD.

Witnesses:
D. D. GRIFFITH,
J. B. WARD.